United States Patent
Wiegers

(10) Patent No.: US 9,061,536 B2
(45) Date of Patent: Jun. 23, 2015

(54) RESINS FOR BULK TOPCOAT

(75) Inventor: Ronald Wiegers, 's-hertogenbosch (NL)

(73) Assignee: Avery Dennison Corporation, Glendale, CA (US)

( * ) Notice: Subject to any disclaimer, the term of this patent is extended or adjusted under 35 U.S.C. 154(b) by 205 days.

(21) Appl. No.: 13/148,474

(22) PCT Filed: Feb. 8, 2010

(86) PCT No.: PCT/US2010/023474
§ 371 (c)(1),
(2), (4) Date: Aug. 8, 2011

(87) PCT Pub. No.: WO2010/091346
PCT Pub. Date: Aug. 12, 2010

(65) Prior Publication Data
US 2011/0318509 A1    Dec. 29, 2011

Related U.S. Application Data

(60) Provisional application No. 61/150,453, filed on Feb. 6, 2009.

(51) Int. Cl.
| C08F 6/00 | (2006.01) |
| B41M 5/52 | (2006.01) |
| C09D 175/16 | (2006.01) |
| C08J 3/00 | (2006.01) |
| C08L 75/04 | (2006.01) |

(52) U.S. Cl.
CPC ........... B41M 5/5281 (2013.01); *B41M 5/5227* (2013.01); *C08L 75/04* (2013.01); C09D 175/16 (2013.01)

(58) Field of Classification Search
USPC .............. 257/432; 428/32.21, 32.22, 32.38; 510/276, 337; 524/500
See application file for complete search history.

(56) References Cited

U.S. PATENT DOCUMENTS

| 6,387,976 | B1 | 5/2002 | Flat |
| 7,758,965 | B2 * | 7/2010 | Servante et al. ........... 428/424.2 |
| 2004/0091645 | A1 * | 5/2004 | Heederik et al. ............. 428/32.1 |
| 2004/0197572 | A1 | 10/2004 | Bell |
| 2007/0116905 | A1 | 5/2007 | Huynh |
| 2008/0317957 | A1 * | 12/2008 | Overbeek et al. ............. 427/256 |

FOREIGN PATENT DOCUMENTS

| FR | WO 97/27064 | * | 7/1997 |
| WO | 02/38382 | | 5/2002 |
| WO | 2007/071328 | | 6/2007 |
| WO | 2008/101661 | | 8/2008 |

OTHER PUBLICATIONS

International Search Report dated Aug. 8, 2010 for International Patent Application No. PCT/US2010/023474 filed Feb. 8, 2010.
Written Opinion dated Aug. 8, 2010 for International Patent Application No. PCT/US2010/023474 filed Aug. 6, 2011.

* cited by examiner

*Primary Examiner* — Terressa Boykin
(74) *Attorney, Agent, or Firm* — Avery Dennison Corporation

(57) ABSTRACT

A topcoating (14) is disclosed for a face material (12) which exhibits desirable ink anchorage, anti-pinholing properties, moisture/water resistance, optical characteristics and/or anti-blocking properties. In one embodiment, the topcoating comprises a formulation of polyurethane and polyurethane acrylate. Suitably, the polyurethane is an aliphatic polyurethane and/or the polyurethane acrylate is an aliphatic polyurethane acrylate. In one suitable embodiment, either or both the polyurethane and polyurethane acrylate are water dispersible. In a further embodiment, suitably, the polyurethane is a polyether urethane. Suitably, the formulation may further include a crosslinker, e.g., a water soluble or water dispersible crosslinker.

19 Claims, 5 Drawing Sheets

RESINS FOR BULK TOPCOAT

CROSS-REFERENCE TO RELATED APPLICATION

The present application is a 371 of International Application No. PCT/US2010/023474, which was published in English on Aug. 12, 2010, and claims the benefit of U.S. Provisional Application No. 61/150,453 filed Feb. 6, 2009, both of which are incorporated herein by reference in their entireties.

BACKGROUND

The present inventive subject matter relates generally to the art of printable or print receptive topcoats. Particular relevance is found in connection with a printable or print receptive topcoat that is applied over polyolefin materials for UV (ultraviolet) printing applications, and accordingly the present specification makes specific reference thereto. However, it is to be appreciated that aspects of the present inventive subject matter are also equally amenable to the topcoating of other filmic or face materials and/or other like applications.

Various formulations of printable or print receptive topcoatings, e.g., for polyolefin and/or other filmic or face materials, are generally known in the art. For example, a printable or print receptive topcoat based on a combination of polyacrylates and polyurethanes is described in U.S. Patent Application Publication, Pub. No. US 2004/0197572 A1, which is incorporated by reference herein in its entirety. One drawback of these types of compositions is the moderate anchorage of the topcoat to the face material. Furthermore, these types of compositions tend to cause problems with blocking, i.e., the unwanted adhesion of the dried topcoat to the backside of the filmic face material after production of the intermediate topcoated material. Another drawback to these compositions is their tendency to bond with silicones present in the release system which can result in undesired effects on the printing performance.

Another topcoat composition is described in the Patent Cooperation Treaty Application, International Pub. No. WO 02/38382 A1, which is incorporated by reference herein in its entirety. In the foregoing, a combination of various acrylic resins is disclosed. These topcoat compositions, however, suffer from poor anchorage of the topcoat to the substrate as well as from poor chemical resistance.

Another printable or print receptive topcoating is disclosed in U.S. Patent Application Publication, Pub. No. US 2007/116905 A1, which is incorporated by reference herein in its entirety. The print receptive topcoat described therein is composed of a water dispersible polyether urethane and a water dispersible polyester urethane.

In any event, the use of different formulations of printable or print receptive topcoatings can be problematic or limited in one or more ways. Examples of some frequently encountered problems or limitations include undesirable pinholing and/or blocking and/or poor ink-anchorage characteristics. In particular, pinholing may be caused by silicone contamination (e.g., obtained from a liner applied to the backside of the underlying film or other face material on which the topcoat is being deposited), and blocking can result by adhesion of the topcoat to the backside of the underlying film or face material. Still further, it is commonly advantageous for the topcoating to exhibit other desirable characteristics such as, good print quality, significant water resistance, appropriate gloss, suitable optical properties (e.g., haze, clarity and/or total transmittance), etc.

Accordingly, a new and/or improved printable or print receptive topcoating is disclosed which addresses the above-referenced problem(s) and/or others.

SUMMARY

In accordance with one embodiment, a printable or print receptive topcoating is disclosed.

In accordance with another embodiment, a film, face material or laminate including the printable or print receptive topcoating is disclosed.

In accordance with still another embodiment, a method of constructing or producing the film, face material or laminate including the printable or print receptive topcoating is disclosed.

Numerous advantages and benefits of the inventive subject matter disclosed herein will become apparent to those of ordinary skill in the art upon reading and understanding the present specification.

BRIEF DESCRIPTION OF THE DRAWING(S)

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENT(S)

Figure 1:
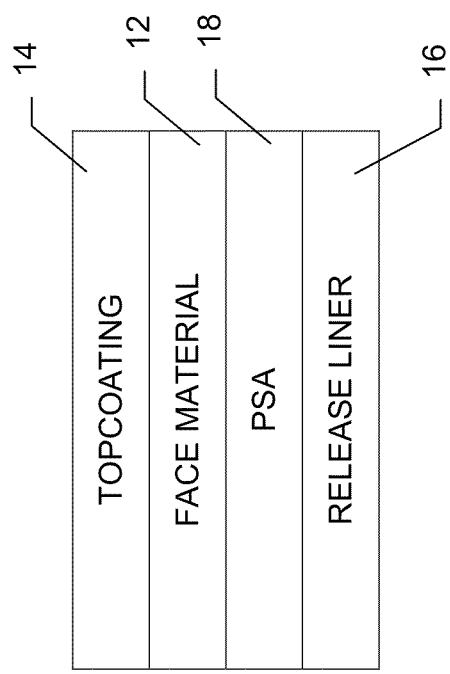
FIG. 1 is a diagrammatic illustration showing an exemplary completed construction including a topcoating sample prepared and tested in accordance with the experiments described herein.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

In general, the present specification discloses one or more inventive topcoatings that are suitable for printing or otherwise receiving ink thereon. Also disclosed are one or more films or other face materials or laminates including the printable or print receptive topcoatings described herein along with the disclosure of one or more methods for constructing or producing the same. More specifically, topcoatings in accordance with the inventive subject matter disclosed herein suitably exhibit one or more of the following: (i) limited pinholing and/or blocking; (ii) good ink-anchorage characteristics; (iii) good image quality; (iv) desirable optical properties such as gloss, haze, clarity and absence of color; and/or (v) significant water and chemical resistance. The proposed topcoating is particularly well suited to application over PP (polypropylene), PET (poly(ethylene terephthalate)) or PE (polyethylene) films, but may nonetheless also be applied over other face materials.

Broadly speaking, the topcoating proposed herein is an aqueous dispersion comprising at least: (1) a polyurethane, and (2) a polyurethane acrylate. In particular, suitable topcoating materials are composed of: (1) an aliphatic polyurethane, and (2) an aliphatic polyurethane acrylate. In fact, experimentation (described below) has identified the following formulations to be particularly advantageous—namely, an aqueous dispersion comprising at least: (1) a waterborne aliphatic polyether polyurethane, and (2) a waterborne aliphatic urethane acrylate.

Suitable polyurethanes for application in accordance with the present inventive subject matter are selected from waterborne polyester-polyurethanes and waterborne polyether-polyurethanes. A polyester-polyurethane polymer is the reaction product of a predominantly aliphatic polyisocyanate component and a polyester polyol component. As used herein, the term "predominantly aliphatic" means that at least 70 weight percent of the polyisocyanate component is an aliphatic polyisocyanate, in which all of the isocyanate groups are directly bonded to aliphatic or cycloaliphatic groups, irrespective of whether aromatic groups are also present. More preferably, the amount of aliphatic polyisocyanate is at least 85 weight %, and most preferably, 100 weight %, of the polyisocyanate component. Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetramethylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMCI). Mixtures of aliphatic polyisocyanates can also be used.

Polyester polyols that may be used in the polyester polyol component include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof. Also included are polycarboxylic acids, especially dicarboxylic acids, and ester-forming derivatives thereof. Examples include succinic, glutaric and adipic acids or their methyl esters, phthalic anhydride and dimethyl terephthalate. Polyesters obtained by the polymerisation of lactones, for example caprolactone, in conjunction with a polyol may also be used. Commercially available polyester-polyurethanes useful in accordance with the present inventive subject matter include those sold under the trade names AVALURE UR-425, AVALURE UR-430, AVALURE UR-405 and AVALURE UR-410 by Goodrich Corporation (Charlotte, N.C.), NEOREZ R600, NEOREZ R9679 and NEOREZ R-989 all by NeoResins (Waalwijk, The Netherlands).

A polyether-polyurethane polymer is the reaction product of a predominantly aliphatic polyisocyanate component and a polyether polyol component. Useful aliphatic polyisocyanates are described above. Suitable polyether polyols include products obtained by the polymerization of a cyclic oxide or by the addition of one or more such oxides to polyfunctional initiators. Such polymerized cyclic oxides include, for example, ethylene oxide, propylene oxide and tetrahydrofuran. Such polyfunctional initiators having oxides added include, for example, water, ethylene glycol, propylene glycol, diethylene glycol, cyclohexane dimethanol, glycerol, trimethylopropane, pentaerythritol and Bisphenols (such as A and F).

Suitable polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Commercially available polyether-polyurethanes useful in accordance with the present inventive subject matter include those sold under the trade names SANCURE 878, AVALURE UR-450 and SANCURE 861 by Goodrich Corporation (Charlotte, N.C.), NEOREZ R563 and NEOREZ R-551 by NeoResins (Waalwijk, The Netherlands).

In accordance with aspects of the present inventive subject matter, urethane acrylates are used. The functionality (amount of acrylic moieties per molecule) for urethane acrylates varies in practice between one and six. Generally speaking: the lower the functionality, the lower the reactivity, the better the flexibility and the lower the viscosity. The topcoat compositions in accordance with the present inventive subject matter preferably have a functionality of two or three.

Monofunctional urethane acrylates are a specialty product, which are used to improve adhesion to difficult substrates and to improve flexibility. These products are very low in viscosity. High functionality urethane acrylates (functionality 4 or higher) are also specialty products that are used to improve reactivity, scratch resistance, chemical resistance, etc.

Four types of isocyanates can be used for urethane acrylate synthesis: monoisocyanates, aliphatic diisocyanates, aromatic diisocyanates and polymeric isocyanates. Isocyanates that are not monoisocyanates are also called polyisocyanates. Monoisocyanates are used for monofunctional urethane acrylates only, and this type of oligomer is described above. Diisocyanates are by far the most widely used in urethane acrylate synthesis. They are available in aliphatic and aromatic diisocynates. Aromatic diisocyanates are used for the manufacture of the so-called aromatic urethane acrylates. The incorporation of an aromatic diisocyanate makes the urethane acrylate harder and gives it a better scratch resistance. Aromatic urethane acrylates are also significantly lower cost than aliphatic urethane acrylate. This makes them interesting for those applications, where the performance of a urethane acrylate is desired (e.g. a good flexibility or abrasion resistance) but the formulation has to be relatively low cost. One drawback of aromatic urethane acrylates is that they tend to yellow and therefore they are less appropriate for long lasting applications on white or light colored substrates.

Aliphatic diisocyanates are used in aliphatic urethane acrylates. Aliphatic urethane acrylates are slightly more flexible than aromatic urethane acrylates with the same functionality, a similar polyol modifier and at similar molecular weight. Once advantage of aliphatic urethane acrylates is the fact that they are virtually non-yellowing and therefore can be used for long lasting applications, on white or light colored substrates.

Polymeric isocyanates are used less for urethane acrylates than diisocyanates. They are essentially used for higher functionality (e.g., 3 and higher) urethane acrylates. Isocyanate-functional reactants are made from polyisocyanates reacted with a compound containing active hydrogen functionality with hydroxyl groups being typical, although mercaptan groups, amine groups, and carboxyl groups also can be used.

Polyisocyanates are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane (H 6 XDI), dicyclohexylmethane diisocyanate (H 12 MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof.

The topcoat in accordance with the present inventive subject matter preferably comprises aliphatic urethane acrylates that have a polyester or a polyether backbone.

Polyether urethane acrylates are typically more flexible than polyester urethane acrylates and often lower cost. In addition, a polyether urethane acrylate will have a slightly lower viscosity that a polyester urethane acrylate with the same functionality and approximately the same molecular weight.

Polyesters can be synthesized, for example, by reacting C1-C12 diacids (or their corresponding anhydrides) or other diacids with a diol or a mixture of diols. The mixture is heated in the presence of a catalyst to temperatures sufficient to remove the water formed in the condensation reaction.

Polyethers can be synthesized from ethylene oxide to have a molecular weight of, for example, about 1,000-6000 (Mn) by conventional techniques well known in the art. Polyether polyols (e.g., block polyethylene and polypropylene oxide homo- and co-polymers) optionally alkylated (e.g., polytetramethylene ether glycols) also can be used. Additionally, ethylene oxide and propylene oxide can be co-reacted to form the polyether polyol, or the polyether polyol can be built on a di-functional compound that contains groups reactive with ethylene oxide and propylene oxide. Such suitable groups include, for example, hydroxyl groups, thiol groups, acid groups, and amine groups. Accordingly, diols, triols, dithiols, diacids, diamines, and the like, are suitable di-functional compounds which can be reacted with ethylene oxide and/or propylene oxide for synthesizing the polyether in accordance with the present inventive subject matter. Suitable such compounds include, for example, alkylene glycols, typically ranging from about 2 to 8 carbon atoms (including cycloalkylene glycols). Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane,1,5-diol, 1,4-cyclohexanedimethanol, and the like, and mixtures thereof. Diethylene glycol, dipropylene glycol, and the like additionally can be used as desirable or convenient.

A hydroxy (meth)acrylate monomer is included to functionalize the polyester-polyether urethane for later UV curing. Suitable hydroxy (meth)acrylates include, for example, hydroxyethyl (meth)acrylate, hydroxypropyl (meth)acrylate, hydroxybutyl (meth)acrylate, caprolactone acrylate and the like. Alternatively, other hydroxy functional monomers may be employed, for example, hydroxybutyl vinyl ether or allyl alcohol. In keeping with terminology in this field, the parenthetical group is optional. Thus, "(alkyl)acrylate" means "acrylate and alkylacrylate".

Typical commercially available examples of urethane acrylates that can be used in accordance the present inventive subject matter are UCECOAT 7772, UCECOAT 7773, UCECOAT 7849, UCECOAT 7770 (all from CYTEC Surface Specialties), Joncryl U6336 (BASF), BAYHYDROL UV 2317, BAYHYDROL UV VP LS 2348 (Bayer).

The topcoat in accordance with the present inventive subject matter may include a water dispersible crosslinker. Suitable water-dispersible polyfunctional chemically activatable crosslinking agents are commercially available. These crosslinking agents include dispersible formulations of polyfunctional aziridines, isocyanates, melamine resins, epoxies, oxazolines, carbodiimides and other polyfunctional crosslinkers. In one embodiment, the crosslinking agents are added at an amount in a range of from about 0.1 parts to about 30 parts based on 100 parts total solids. In one other embodiment, the crosslinking agents are added at an amount in a range of from about 1 part to about 20 parts based on 100 parts total solids. In another embodiment, the crosslinking agents are added at an amount in a range of from about 2 parts to about 15 parts based on 100 parts total solids. In still a further embodiment, the crosslinking agents are added at an amount greater than or equal to about 4 parts based on 100 parts total solids, and in yet a further embodiment, the crosslinking agents are added at an amount in a range of from about 4 parts to about 7 parts based on 100 parts total solids. Adding crosslinking agents to the polyurethane dispersion composition may form an interpenetrating or interconnected network having crosslinked matrixes which link the blended polymers with covalent and/or non-covalent linkages.

Other additives can be added as well to obtain a certain desired characteristic, such as waxes, defoamers, surfactants, colorants, anti-oxidants, UV stabilizers, luminescents, crosslinkers, etc.

In one embodiment, the topcoat composition contains anti-blocking additives. These additives reduce the tendency of the film to stick together when it is in roll form. The anti-blocking additives include natural silica, diatomaceous earth, synthetic silica, glass spheres, ceramic particles, etc. Slip additives including primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N, NN-ethylenebisstearamide, N, NN-ethylenebisolamide and the like; and combinations of any two or more of the foregoing amides can also be included.

The topcoat compositions in accordance with the present inventive subject matter may be applied to the filmic materials by methods well known in the art. Non-limiting examples of these application methods are Meyer-rod coating, direct gravure coating, die coating, reverse gravure coating, roll coating, spray coating, knife coating, and the like.

Suitably, the face material onto which the topcoat composition in accordance with the present inventive subject matter is coated (as shown in FIG. 1) may be formed from sheet materials selected with reference to application specific criteria. Such criteria may include, for example, desired dimensions (height, length and thickness), surface texture, composition, flexibility, and other physical and economic attributes or properties. Suitable face materials may include, for example, synthetic papers such as polyolefin type, polystyrene type; various plastic films or sheets such as polyolefin, polyvinyl chloride, polyethylene terephthalate, polystyrene, polymethacrylate and polycarbonate. The face material may be, or may include, a multilayer polymeric sheet. The multi-layers may be coextruded, or the multi-layers may be laminated together. In one embodiment, the face material includes both co-extruded multi-layers and laminated multi-layers. In addition, a white opaque film may be formed by adding a white pigment to one or more of the aforementioned synthetic resins and used as the face material. In one embodiment, a foamed film is used as the face material. The foamed film may be formed by a conventional foaming operation. In another embodiment, the face material may be a laminated body formed by combining a plurality of single-layered sheets composed of the above listed materials. Examples of such a laminated body may include the combination of cellulose fiber paper with synthetic paper, and a laminated body of combined cellulose fiber paper with a plastic film or sheet. In another suitable embodiment, the face material includes coated and uncoated papers, metalized papers, aluminum foil, laminated paper and paper with a polymeric material extruded onto the surface of said paper.

The thickness of the face material, formed in the manner as mentioned above, is optionally determined with reference to application specific criteria. Such criteria may include the desired end use. In one embodiment, the sheet thickness is in a range of from about 10 μm to about 300 μm. In another embodiment, the sheet thickness is in a range of from about 20 μm to about 200 μm. In still another embodiment, the sheet thickness is in a range of from about 30 μm to about 150 μm. Optionally, a primer treatment or a corona discharging treatment or a plasma treatment may be used on the face material to increase a bonding strength between the face material and the dried topcoat composition to be formed on a surface of the face material.

The topcoat compositions in accordance with the present inventive subject matter, to be formed as mentioned above, may have a predetermined thickness based on factors such as viscosity; application type, amount and method; desired end use; and the like. In one embodiment, the thickness may be in a range of about 0.05 μm to about 2 μm. In one embodiment, the thickness may be in a range of from about 0.1 μm to about 1 μm, and in one embodiment in a range of from about 0.15 μm to about 0.5 μm, all thicknesses measured after drying the coated composition.

Experiment #1

In accordance with a first experiment, a plurality of samples of printable or print receptive topcoatings were prepared and tested as follows. Each sample topcoating was coated onto an underlying face material—namely, a 60 micron thick biaxially oriented polypropylene (BOPP) film that was single side corona treated by the supplier, which in this case was Innovia Films. In short, the aforementioned film is referred to as BOPP60. The coating was carried out on a Dixon pilot coater equipped with a reverse gravure cylinder having a 40 cc/m² cell volume. The coated volume was 13 cc/m². During coating, the line speed was 10 m/min, and a 24 cm wide coating of the of sample topcoat material was applied to a 26 cm wide web of the face material. In this manner, each sample topcoat was applied to the corona treated side of the face material. Thereafter, drying of each sample was done at an air temperature of 80° C., yielding a web temperature of 41° C. In practice, a completed construction is generally achieved by adhering a PSA (Pressure Sensitive Adhesive) coated release liner to the back surface of the topcoated face material.

Accordingly, the completed construction would have the multi-layer configuration shown in FIG. 1. More specifically, as shown in FIG. 1, the completed construction 10 includes a face material 12 having a topcoating 14 applied or otherwise formed on a front or first major surface thereof. On an opposite or back surface of the face material 12, the face material 12 is releasably adhered to a release liner 16 via a layer of adhesive 18, e.g., such as a PSA.

Pinholing

The pinholing performance of the topcoating was quantified by the so called spread test carried out in duplicate for each sample as follows. Samples of the topcoated face material were first cut to a size of approximately 5×15 cm. After a certain aging period, the backside of a release liner was brought into contact with the topcoated side of the sample face material, i.e., so that the back or outer surface of the liner was in contact with the top or outer surface of the sample topcoating layer. This configuration or arrangement was then placed under pressure (applied by an approximately 10 kg weight) for a period of approximately 4 hours. Following the pressure application period, the liner was separated from the sample face material (i.e., so as to expose the top or outer surface of the sample topcoating layer), and by means of a Hamilton 100-microliter syringe, a 2 microliter droplet of a model ink (i.e., a 0.2 wt % of crystal violet in an isopropyl alcohol (IPA) solution) was applied to the topcoated side of the sample face material, and the droplet was allowed to dry. Per sample, 5 droplets were thus applied. The size of each dried droplet was then measured by scanning an image of the obtained droplet and analyzing the image to obtain the Feret diameter thereof (i.e., the maximum distance between any two points in the droplet). From experience, relatively larger droplets generally indicate a relatively better quality topcoating (i.e., relatively less pinholing).

Blocking

Testing for the evaluation of the blocking phenomena was performed with each measurement carried out in triplicate using the following equipment and auxiliaries:

a tensile tester with a 50 N load cell;

a blocking measurement frame, incorporating a 4 mm brass bar;

two PE-plates (15×5 cm each);

ten pieces of completed constructions (15×5 cm each) to be used as buffer materials;

a roll of PP (polypropylene) film 60 microns thick (i.e., PP60), which has been single side corona treated by the supplier—namely Innovia Films in this case;

a 10 kg weight; and, an oven set at 50° C.

Immediately after coating and drying the topcoat being tested, a sheet of the PP60 was put on top of the topcoated film, making sure that the corona treated side of the PP60 was in contact with the topcoated side of the test sample. Pieces (approximately 26×7 cm) were cut out of the test sample/PP60 combination, and they were marked with the appropriate sample indications. These pieces were then stacked together with a PE-plate and some buffer material placed on the top and bottom of the stack. The 10 kg weight was then placed on top of the entire stack. The total stack was kept for 5 days in the oven at 50° C. After this, the stack was removed from the oven and the test sample/PP60 combinations were separated from the auxiliary materials (i.e., PE plates and buffer material).

Figure 2:
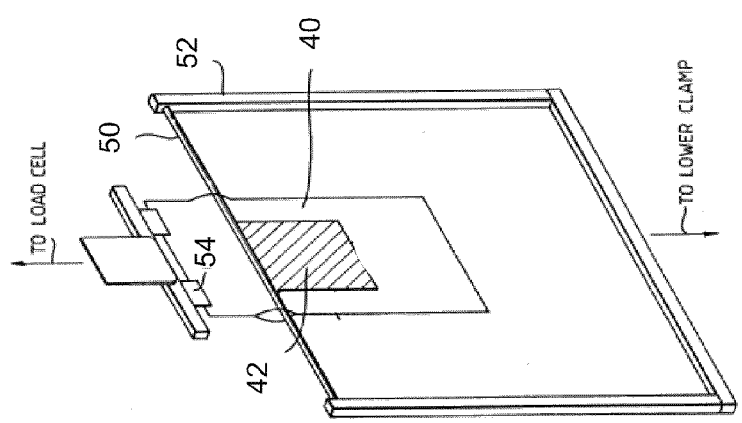
FIG. 2 is a diagrammatic illustration showing the configuration of the blocking measurement setup.

As shown in FIG. 2, each test sample/PP60 combination 40 was mounted in the tensile tester by carefully peeling apart the two filmic materials (i.e., the topcoated test sample and the PP60 film) until the point where the blocking started (indicated generally by the region 42). The loose ends of the two layers were extended on opposite sides of a brass bar 50 (secured within a frame 52) and clamped together again in a top grip 54. With the frame 52 held in a lower grip (not shown), the material 40 was then pulled by the tensile tester over the bar 50.

The raw data (i.e., the force, needed to pull the material over the brass bar) for each measurement was separately collected in an appropriate file. Approximately 950 data points were collected for each measurement. Each file was then imported into an appropriate program which calculated the average blocking force. For each sample, the blocking force (log 70% percentile) was calculated. To avoid edge effects, the first and the last 100 data points were omitted from the calculation. Generally, relatively lower values indicate relatively less blocking.

Ink Anchorage

Ink anchorage was measured or otherwise determined with the use of a Flexiproof 100 flexographic proofing press (manufactured by RK Print Coat Instruments Ltd.) equipped with a UV (ultraviolet) curing facility and a banded anilox roller with bands of 3, 4, 5, 6, 8 and 13 cc/m$^2$. The ink used for this test was a process magenta UV flexographic ink known as Flexocure Gemini™ available from XSYS Printing Solutions, a division of the Flint Group. Test samples were first cut to approximately 12.5×10 cm and then mounted on the press for printing. Each sample was printed at 80, 50 and 20 m/min. Immediately after printing, two strips of tape (i.e., Scotch® Magic™ Tape 810 available from 3M) were firmly pressed on the printed surface, and left for approximately 5 seconds. The tape was pulled off (at approximately 180°, as fast as possible) and kept for analysis. To complete the aforementioned analysis, the removed tape is stuck on a piece of paper and the paper is scanned in black and white mode at 300 dpi (dots per inch). The resulting image is analyzed with appropriate software to calculate the mean gray density of a 170×1000 pixel area. This resulted in a value between 70 (indicated that substantially all the ink was pulled off by the tape) and 255 (indicating that substantially no ink was pulled off by the tape). The ultimate value for ink anchorage was obtained by averaging the values of each tape, at all three speeds (i.e., a total of 6 data points). Generally, relatively higher values indicate relatively better anchorage.

Water Resistance

Water resistance was tested by submerging printed samples in water of a prescribed temperature for a prescribed time. The printing of the samples was carried out in accordance with the ink anchorage testing described above, with each sample being printed at 50 m/min. At the moment of water submersion, the print was approximately 4 to 5 days old. The water resistance test was carried out under 3 different conditions, namely: 95° C. for 30 minutes (referred to herein as the pasteurization test); 0° C. for 24 hrs (referred to herein as the ice chest test); and, 40° C. for 1 hr (referred to herein as the shower test).

After the prescribed period of submersion, the samples were dried by patting with a tissue paper, and a test tape is applied and peeled off (again in a similar manner as the ink anchorage test). The removed tape is then analyzed in essentially the same manner as described in above with reference to the ink anchorage test.

Gloss

The gloss of each sample was measured on a gloss meter (namely a Dr. Lange Labor-Reflektometer RL3) in substantial conformance with ISO 2813:1994/Cor 1:1997 as established by the International Organization for Standardization.

Haze, clarity and total transmittance

Haze, clarity and total transmittance were measured on a Hazegard Plus instrument in substantial conformance with ASTM D-1003 and/or ASTM D-1044 as established by ASTM International, originally known as the American Society for Testing and Materials.

Materials for Experiment #1

The materials in the following table (i.e., Table 1) were used in this experiment.

TABLE 1

| Resins: | Solid Concentration (w/w %): | Supplier: |
| --- | --- | --- |
| Neorez R563 | 38 | DSM Neoresins |
| Neorez R9679 | 37 | DSM Neoresins |
| Neorez R600 | 33 | DSM Neoresins |
| Neocryl XK90 | 60 | DSM Neoresins |
| UCECOAT 7849 | 35 | Cytec Surface Specialties |
| UCECOAT 7770 | 35 | Cytec Surface Specialties |
| UCECOAT 7772 | 35 | Cytec Surface Specialties |
| UCECOAT 7773 | 35 | Cytec Surface Specialties |
| Others Materials: | | |
| CX100 | 100 | DSM Neoresins |
| Aquasafe Matting Agent | 12 | Polytex |
| BOPP60 | | Innovia |

More specifically, Neorez R563, Neorez R9679 and Neorez R600 are aliphatic polyurethane resins. Neocryl XK90 is an acrylic co-polymer. CX100 is an aziridine-based crosslinker. Aquasafe Matting Agent is a silicate dispersion available from Polytex. The UCECOAT (UC) resins are aliphatic acrylated polyurethane dispersions, having polymerizable unsaturated end-groups.

Experimental Setup for Experiment #1

A number of different sample topcoatings were prepared as follows in Table 2 in the fashion described above.

TABLE 2

|  | XK90 | R600 | UC7849 | UC7773 | UC7770 | UC7772 | R563 | R9679 | Aquasafe | CX100 | Water |
| --- | --- | --- | --- | --- | --- | --- | --- | --- | --- | --- | --- |
| CE1 | 0.24 | 0.16 | | | | | | | 0.0048 | 0.010 | 12.58 |
| CE2 | | | | | | | 0.23 | 0.17 | 0.0048 | 0.014 | 12.58 |
| E1 | | | 0.16 | | | | 0.24 | | 0.0048 | 0.014 | 12.58 |
| E2 | | | | 0.16 | | | 0.24 | | 0.0048 | 0.014 | 12.58 |
| E3 | | | | | 0.16 | | 0.24 | | 0.0048 | 0.014 | 12.58 |
| E4 | | | | | | 0.16 | 0.24 | | 0.0048 | 0.014 | 12.58 |

In Table 2, the samples corresponding to experiment numbers CE1 and CE2 are comparative examples, and the samples corresponding to experiment numbers E1, E2, E3 and E4 are representative compositions in accordance with suitable inventive embodiments proposed herein. The amounts shown in Table 2 are given in grams per square meter. More specifically, samples CE1 and CE2 were prepared as model examples representative of currently available topcoat compositions. Samples E1-E4 explore the use of the acrylate-capped urethanes. In particular, samples E1-E4 are the UC resins made in combination with R563 (which exhibits excellent printing, but moderate blocking characteristics).

Test Results from Experiment #1

Pinholing

Figure 3:
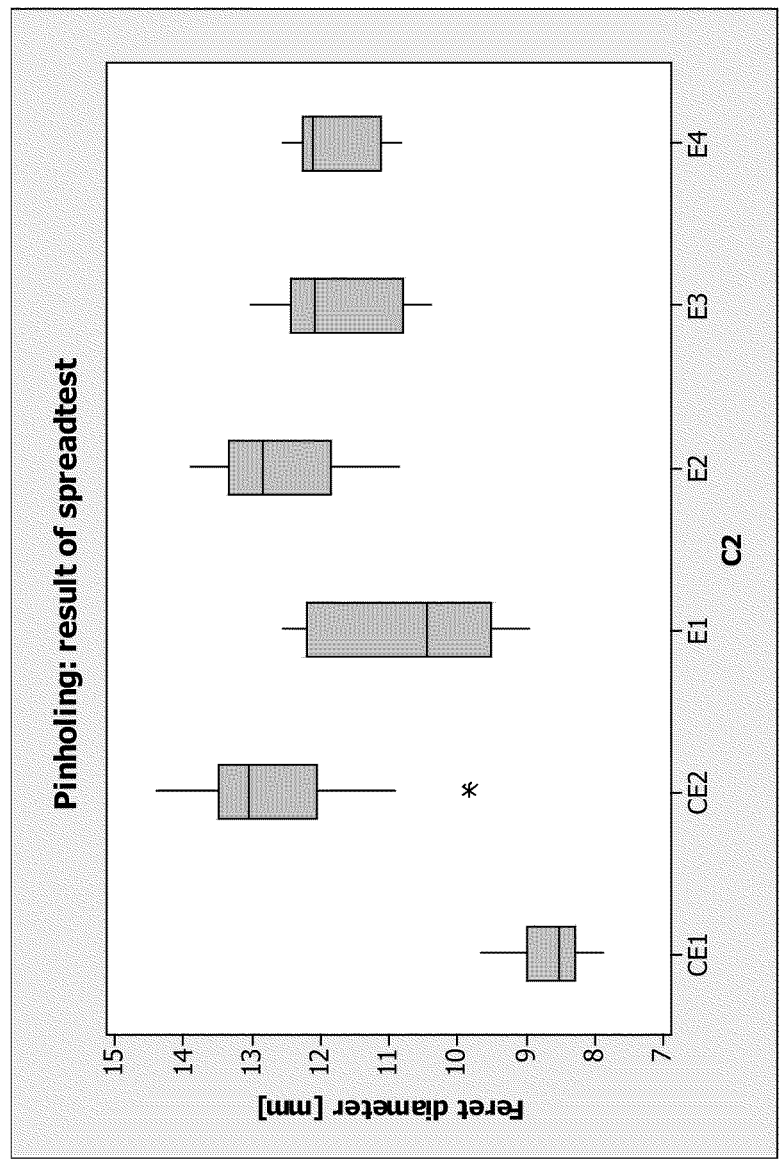
FIG. 3 is a chart showing the pinholing performance of the samples tested in Experiment 1.

The above described spread test was executed approximately 29 hrs after coating the face material with the sample topcoating being tested. The results are shown in the graph illustrated in FIG. 3. As can be seen, the performance of E1-E4, compared to the relatively poor performance of CE1, is improved to the more satisfactory level of CE2.

Blocking

Figure 4:
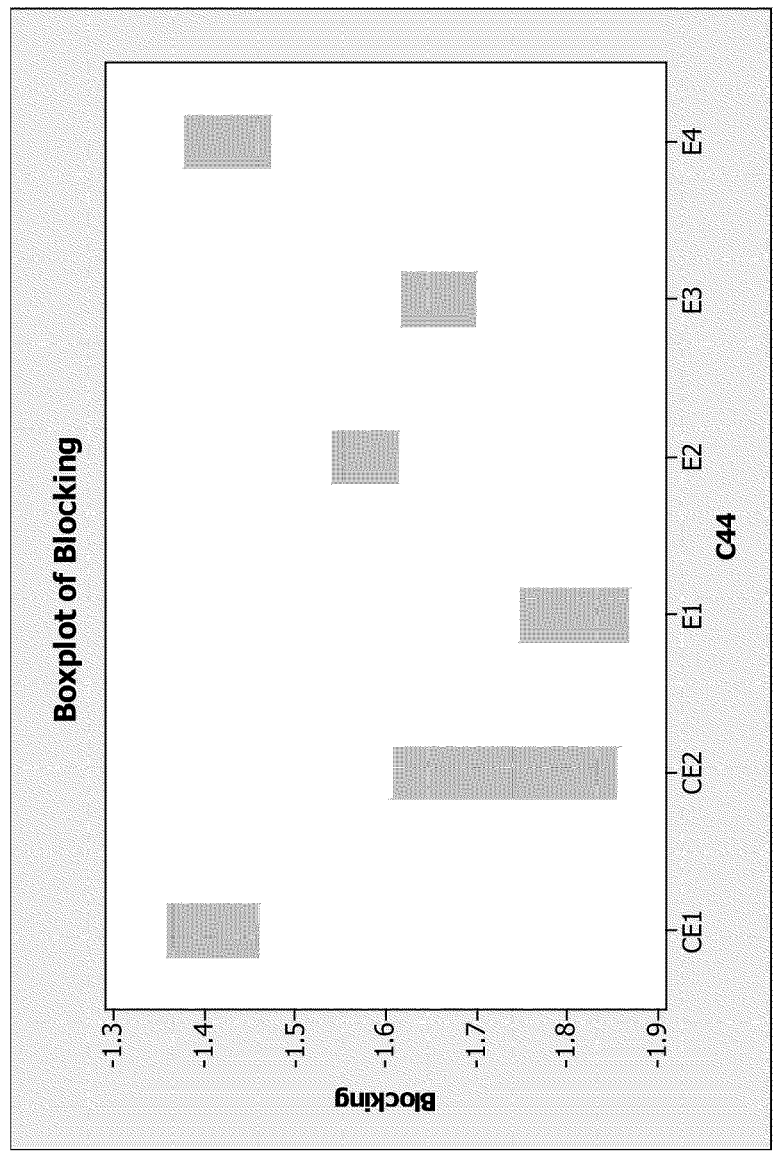
FIG. 4 is a chart showing the blocking performance of the samples tested in Experiment 1.

Blocking was measured as described above approximately 5 days after coating. The results are shown in the graph illustrated in FIG. 4. As can be seen, generally the performance of E1-E3, compared to the relatively poor performance of CE1, is improved to the more satisfactory level of CE2.

Ink Anchorage

Figure 5:
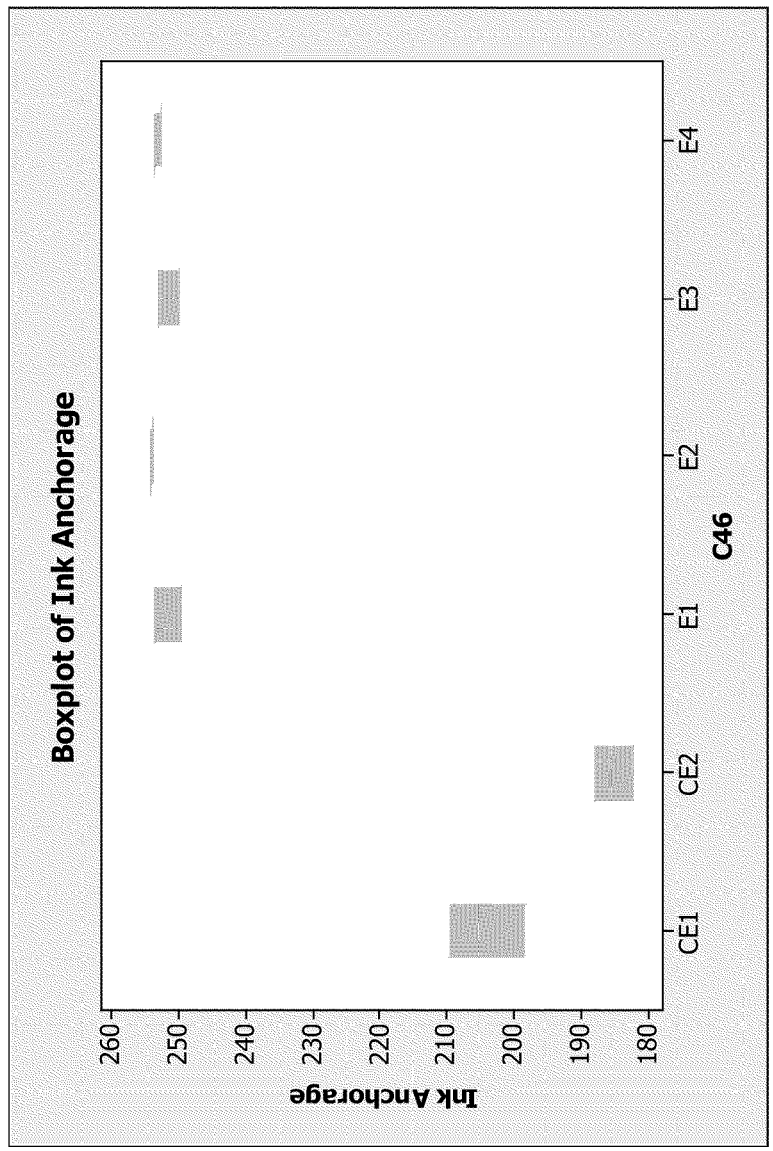
FIG. 5 is a chart showing the UV Flexo ink anchorage performance of the samples tested in Experiment 1.

The ink anchorage was measured as described above 4 days after coating. The results are shown in FIG. 5. It is evident that the performance of E1-E4 is significantly better than that of CE1 and/or CE2.

Water Resistance

On a scale from 1 to 5, the results of the water resistance testing under various test conditions are shown in Table 3 below. A very good performance (i.e., essentially showing no difference compared to a sample that has not been submerged) is rated with a 1, and conversely, a very poor resistance is rated with a 5.

TABLE 3

|  | 95° C., 30 min | 0° C., 24 h | 40° C., 30 min |
|---|---|---|---|
| CE1 | 1 | 1 | 1 |
| CE2 | 1 | 1 | 1 |
| E1 | 4 | 1 | 1 |
| E2 | 4 | 1 | 1 |
| E3 | 3 | 1 | 1 |
| E4 | 3 | 1 | 1 |

From these results, it appears that the samples prepared with urethane acrylates (i.e., E1-E4) have very good performance with respect to the ice chest test and the shower test.

Optical Properties

The optical properties of Haze and Gloss (at an 80° angle of incidence) are shown in Table 4 which follows. Also included is a relative numerical score on a scale of 1-5 wherein 1 represents very good optical properties and 5 represents poor optical properties.

TABLE 4

|  | Haze % | Gloss 80° | Numerical Score |
|---|---|---|---|
| CE1 | 2.79 | 104 | 1 |
| CE2 | 3.24 | 104 | 1 |
| E1 | 4.14 | 103 | 1 |
| E2 | 8.12 | 89 | 4 |
| E3 | 5.03 | 96 | 3 |
| E4 | 8.54 | 82 | 5 |

As can be seen from Table 4, the sample E1 exhibits optical properties roughly comparable to CE1 and CE2.

Conclusions from Experiment #1

The application of reactive UV curable resins in a topcoat tends to provide extremely good ink anchorage and pinholing performance, e.g., compared to the reference formulations of the comparative samples CE1 and CE2.

Experiment #2

In a fashion similar to that described above, a second set of samples were prepared with compositions as shown in Table 5 below, where the amounts are given in grams per square meter. In Experiment #2, CE1, CE2 and E1 have the same composition as the samples carrying the same number in Experiment #1.

TABLE 5

|  | XK90 | R600 | UC7849 | R563 | R9679 | Aquasafe | CX100 | Water |
|---|---|---|---|---|---|---|---|---|
| CE1 | 0.24 | 0.16 |  |  |  | 0.0048 | 0.010 | 12.58 |
| CE2 |  |  |  | 0.232 | 0.168 | 0.0048 | 0.014 | 12.58 |
| E1 |  |  | 0.16 | 0.24 |  | 0.0048 | 0.014 | 12.58 |
| E5 | 0.12 |  | 0.16 | 0.12 |  | 0.0048 | 0.014 | 12.58 |
| E6 |  |  | 0.16 | 0.24 |  | 0.0048 | 0.019 | 12.57 |
| E7 |  |  | 0.16 | 0.24 |  | 0.0048 | 0.024 | 12.57 |
| E8 | 0.24 |  | 0.16 |  |  | 0.0048 | 0.014 | 12.58 |
| E9 | 0.08 |  | 0.24 | 0.08 |  | 0.0048 | 0.014 | 12.58 |
| E10 |  |  | 0.24 | 0.16 |  | 0.0048 | 0.014 | 12.58 |
| E11 |  |  | 0.12 | 0.08 |  | 0.0024 | 0.007 | 12.79 |
| E12 |  |  | 0.48 | 0.32 |  | 0.0096 | 0.028 | 12.16 |
| E13 | 0.16 |  | 0.24 |  |  | 0.0048 | 0.014 | 12.58 |
| E14 |  |  | 0.32 | 0.08 |  | 0.0048 | 0.014 | 12.58 |
| E15 | 0.08 |  |  | 0.192 | 0.128 | 0.0048 | 0.014 | 12.58 |

Using substantially similar evaluation methods as described above, the obtained samples were analyzed. The results are summarized below in the Table 6. Due to slight variations in the experimental set-up and/or other factors, for those samples also tested in Experiment #1, some of the absolute measurements obtained in Experiment #2 may not be exactly the same as those previously acquired. Nevertheless, the relative properties and/or performance among these samples remained largely consistent.

TABLE 6

|  | Blocking | Gloss | Haze % | Pasteurization | Pinholing | Anchorage |
|---|---|---|---|---|---|---|
| CE1 | −0.8 | 99 | 2.19 | 1 | 5 | 200 |
| CE2 | −1.6 | 96 | 2.83 | 1 | 5 | 220 |
| E1 | −1.2 | 95 | 3.33 | 4 | 1 | 253 |
| E5 | −1.2 | 96 | 3.29 | 1 | 4 | 241 |
| E6 | −1.1 | 96 | 3.23 | 1 | 2 | 253 |
| E7 | −1.1 | 97 | 3.26 | 1 | 2 | 251 |
| E8 | −1.1 | 96 | 3.13 | 1 | 5 | 236 |
| E9 | −1.4 | 96 | 3.24 | 4 | 5 | 226 |
| E10 | −1.6 | 95 | 3.69 | 4 | 1 | 248 |

TABLE 6-continued

|     | Blocking | Gloss | Haze % | Pasteur-ization | Pinholing | Anchorage |
|-----|----------|-------|--------|-----------------|-----------|-----------|
| E11 | −1.3     | 98    | 2.40   | 4               | 3         | 248       |
| E12 | −1.5     | 92    | 4.47   | 4               | 1         | 216       |
| E13 | −1.3     | 97    | 3.18   | 1               | 5         | 226       |
| E14 | −1.7     | 95    | 3.59   | 3               | 1         | 242       |
| E15 | −1.5     | 97    | 2.66   | 1               | 5         | 211       |

In Table 6, with regards to pasteurization and print quality or pinholing: 1=excellent, 5=bad. The best performance was obtained with the samples E6 and E7 (having increased crosslinker amounts). These samples combine good pasteurization properties with good pinholing performance and excellent anchorage.

Conclusions from Experiment #2

Experiment #2 has shown that the topcoat compositions prepared in accordance with aspects of the present inventive subject matter are able to yield extremely good UV-ink anchorage performance, whilst maintaining a good performance in water resistance, blocking and pinholing.

In particular, Table 7 provides a relative numerical scoring of the various samples with respect to one another. The numeric scores for each test category are based on a scale of 1-5 with 1 being the best score and 5 being the worst. The overall score for each sample represents a weighted average of the individual scores for that sample. In particular, each test category is weight equally with the exception of ink anchorage which is weighted twice as much as the other test categories.

TABLE 7

|     | Blocking | Gloss | Haze % | Pasteur-ization | Pin-holing | Anchorage | Overall Average |
|-----|----------|-------|--------|-----------------|------------|-----------|-----------------|
| CE1 | 5        | 1     | 1      | 1               | 5          | 5         | 3.3             |
| CE2 | 1        | 2     | 1      | 1               | 5          | 4         | 2.6             |
| E1  | 4        | 2     | 2      | 4               | 1          | 1         | 2.1             |
| E5  | 4        | 2     | 2      | 1               | 4          | 2         | 2.4             |
| E6  | 4        | 2     | 2      | 1               | 2          | 1         | 1.9             |
| E7  | 4        | 2     | 2      | 1               | 2          | 1         | 1.9             |
| E8  | 4        | 2     | 2      | 1               | 5          | 3         | 2.9             |
| E9  | 5        | 2     | 2      | 4               | 5          | 3         | 3.4             |
| E10 | 5        | 2     | 2      | 4               | 1          | 1         | 2.3             |
| E11 | 4        | 2     | 1      | 4               | 3          | 1         | 2.3             |
| E12 | 5        | 3     | 3      | 4               | 1          | 5         | 3.7             |
| E13 | 4        | 1     | 2      | 1               | 5          | 4         | 3.0             |
| E14 | 5        | 2     | 2      | 3               | 1          | 2         | 2.4             |
| E15 | 4        | 1     | 1      | 1               | 5          | 5         | 3.1             |

Experiment 3

The formulation of sample E7 from Experiment #2 was coated onto a metalized paper, namely, a coated paper having aluminum vacuum deposited thereon. For example, such metalized paper can be obtained from suppliers like Vacumet Corp., Rotoflex Metallized Paper Spa. and Glatfelter. In this experiment, the topcoating was applied to the metalized side or layer of the face material.

Ink anchorage was tested on the prepared sample of Experiment #3 in the manner described above. As a comparative example, an uncoated metalized paper was used as a reference. In the case of the uncoated material, the ink does not show any ink anchorage to the metalized layer. The printed sample prepared with the topcoating as described herein shows very good anchorage of the ink to the topcoating, such that attempted removal of the ink results in tearing of the paper fibers underneath the metallic layer.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A printable or print receptive topcoating for a face material, said topcoating comprising:
    a polyether urethane;
    a polyurethane acrylate;
    a crosslinker, wherein the crosslinker comprises an amount in a range of from about 2 parts to about 15 parts based on 100 parts total solids; and
    an anti-blocking additive,
    wherein the polyurethane is a water dispersible polyurethane.

2. The printable or print receptive topcoating as claimed in claim 1, in which the polyurethane acrylate is an aliphatic polyurethane acrylate.

3. The printable or print receptive topcoating as claimed in claim 1, in which the polyurethane acrylate is a water dispersible polyurethane acrylate.

4. The printable or print receptive topcoating as claimed in claim 1, wherein the polyurethane acrylate has a functionality of two or three.

5. The printable or print receptive topcoating as claimed in claim 1, in which the crosslinker is water soluble or water dispersible.

6. The printable or print receptive topcoating as claimed in claim 1, in which the crosslinker is an aziridine crosslinker.

7. The printable or print receptive topcoating as claimed in claim 1, wherein the crosslinker comprises an amount of the topcoating greater than or equal to about 4 parts based on 100 parts total solids.

8. The printable or print receptive topcoating as claimed in claim 1, wherein the crosslinker comprises an amount of the topcoating in a range of from about 4 part to about 7 parts based on 100 parts total solids.

9. The printable or print receptive topcoating as claimed in claim 1, wherein the topcoating further comprises:
   a silicate dispersion.

10. The printable or print receptive topcoating as claimed in claim 1, wherein the topcoating further comprises a slip additive.

11. The printable or print receptive topcoating as claimed in claim 1, having a sheet or rolled construction formed on a surface thereof.

12. The printable or print receptive top coating of claim 11, wherein the sheet or rolled construction includes a face material that has the topcoating formed on a print receiving side thereof.

13. The printable or print receptive top coating of claim 12, wherein the sheet or rolled construction further comprises:
   a release liner, said face material being releasably adhered on its back side to the release liner via an adhesive, said back side of the face material being opposite the print receiving side thereof.

14. The printable or print receptive top coating of claim 13, wherein the adhesive is a pressure sensitive adhesive.

15. The printable or print receptive top coating of any one of claim 12, wherein the face material comprises at least one of a laminate, a film or a paper.

16. The printable or print receptive top coating of any one of claim 12, wherein the face material comprises polypropylene.

17. The printable or print receptive top coating of claim 16, wherein the polypropylene is bi-axially oriented.

18. The printable or print receptive top coating any one of claim 12, wherein the face material comprises a metalized paper.

19. The printable or print receptive top coating of claim 18, wherein the metalized paper includes at least one metal surface and the topcoating is formed on said metal surface.

* * * * *